United States Patent [19]

Hirose et al.

[11] Patent Number: 4,825,315
[45] Date of Patent: Apr. 25, 1989

[54] MAGNETIC DISC DRIVING DEVICE

[75] Inventors: Etsurou Hirose; Toshio Tsubaki; Takeshi Tokunaga; Osamu Isoo, all of Hitachi, Japan

[73] Assignee: Hitachi, Ltd., Tokyo, Japan

[21] Appl. No.: 105,806

[22] Filed: Oct. 8, 1987

Related U.S. Application Data

[63] Continuation of Ser. No. 769,322, Aug. 26, 1985, abandoned.

[30] Foreign Application Priority Data

Sep. 7, 1984 [JP]  Japan ................................ 59-188293

[51] Int. Cl.[4] ............................................ G11B 5/012
[52] U.S. Cl. .................................................. 360/97.01
[58] Field of Search .................................... 360/97-99, 360/106

[56] References Cited

U.S. PATENT DOCUMENTS

4,669,009  5/1987  Naoi ...................................... 360/99

Primary Examiner—A. J. Heinz
Attorney, Agent, or Firm—Antonelli, Terry & Wands

[57] ABSTRACT

A drive motor is premounted on one control substrate disposed only on one side of a body. The control substrate, a mounting plate on which a collet mechanism and others are installed, a head mechanism, a stepping motor, and a front panel are detachably provided on the body at every part. After general assembly of the magnetic disc driving device, parts which constitute the magnetic disc driving device can thus be checked and serviced in a simple manner.

10 Claims, 11 Drawing Sheets

MAGNETIC DISC DRIVING DEVICE

This is a continuation of application of Ser. No. 769,322, filed Aug. 26, 1985, now abandoned.

BACKGROUND OF THE INVENTION

This invention relates to a magnetic disc driving device suitable for recording and reproducing data on both sides of a flexible magnetic disc.

In, for example, Japanese Laid-Open patent application No. 90274/1984, a magnetic disc driving device is proposed which comprises a control substrate on both upper and lower sides of a body. A large number of lead wires and a plug sockets for electrically connecting the upper side control substrate and the lower side control substrate are required, and thus the assembly and wiring of the device are complicated; resulting in limited productivity.

Further, with a magnetic disc driving device of the aforementioned type, the great progress has recently been made in the miniaturization of the device and increased density of the magnetic disc along with a rapid increase in the use of the device. Consequently, there has been an increase in the rate at which parts wear out, and thus the task of replacing the parts has grown. Given this situation, it is expected that such devices as will facilitate inspection, service and other requirements for parts which constitute the device after the device is entirely assembled will be provided as soon as possible.

SUMMARY OF THE INVENTION

In view of the situation mentioned above, an object of this invention is to provide a magnetic disc driving device wherein inspection, service and other requirements on parts which constitute the device can be simplified, thereby enhancing productivity.

The invention is then characterized in that parts of a body, a control substrate disposed only on one side of the body and premounted with a drive motor, a mounting plate disposed on another side of the body, a head mechanism disposed on the other side of the body as in the case of the mounting plate, a stepping motor disposed on a side of the body, and a front panel disposed on a front of the body are made available at least in component form, and each part is detachably mounted on the body.

DETAILED DESCRIPTION

One preferred embodiment of this invention will now be described with reference to the accompanying drawings.

Figure 1:
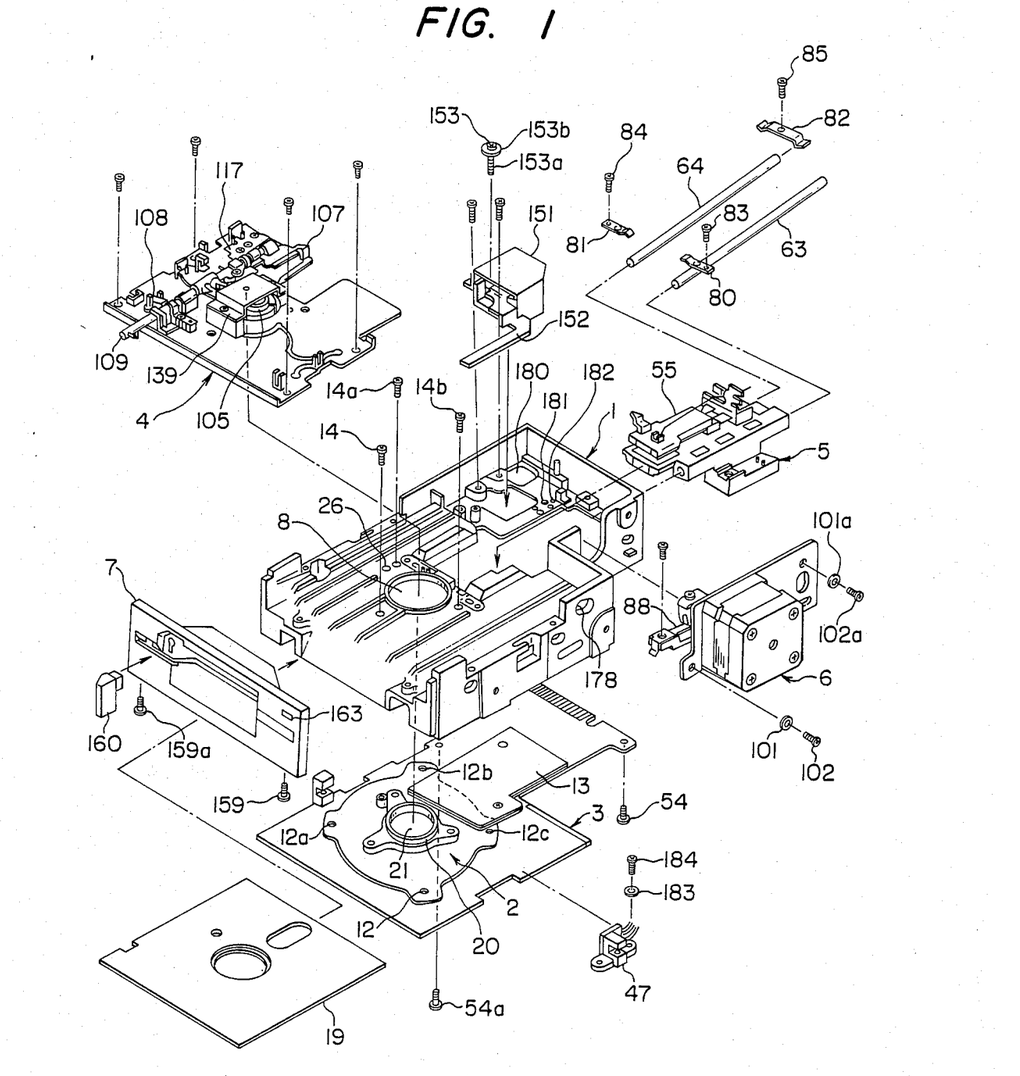
FIG. 1 is an exploded perspective view of a magnetic disc driving device constructed in accordance with the present invention.

In FIG. 1, a magnetic disc driving device comprises blocking at least parts of a body 1 of aluminum die casting, a control substrate 3 disposed only on one side (lower side in the embodiment) of the body 1 and a premounted drive motor 2, a mounting plate 4 disposed on another side (upper side in the embodiment) of the body 1, a head mechanism 5 disposed on another side of the body 1 as in the case of the mounting plate 4, a stepping motor 6 disposed on a side of the body 1, and a front panel 7 disposed on a front of the body 1, and providing each part detachably on the body 1.

A circular opening 8 and three mounting holes 9, 10, 11, disposed around the opening 8, are provided in the body 1. The drive motor 2 such as for example, a brushless direct drive motor is premounted on the control substrate 3 by screws 12, 12a, 12b, 12c. The drive motor 2 is mounted detachably on the body 1 through a magnetic shield plate 13 by the mounting holes 9, 10, 11 and screws 14, 14a, 14b.

Figure 3:
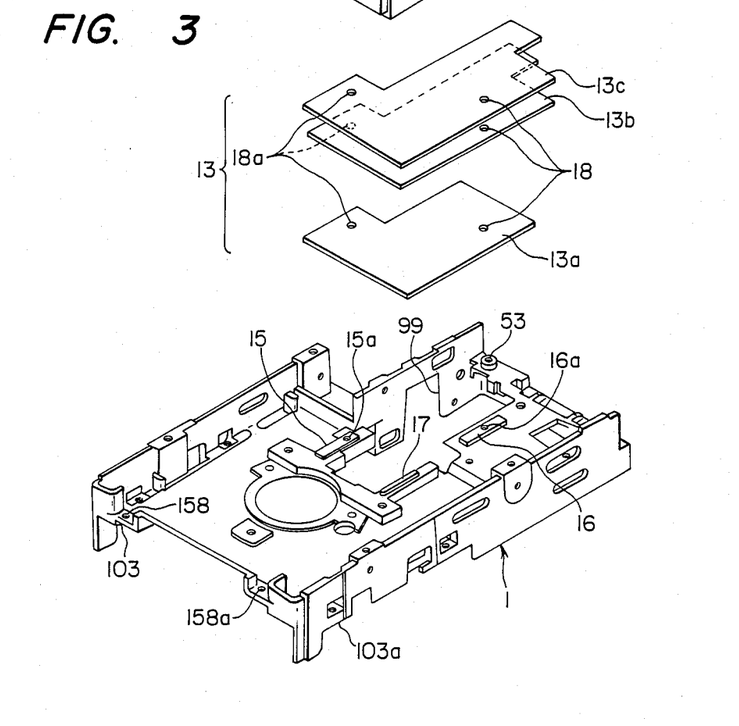
FIG. 3 is a lower perspective view of the body of FIG. 1.

The magnetic shield plate 13 is constituted of, as shown in FIG. 3, a shield plate 13a of permalloy, a shield plate 13b of copper and an insulating plate 13c. For shielding effect and space requirement, the copper shield plate 13b and the insulating plate 13c extend longitudinally of the body 1 more largely than the permalloy shield plate 13a. As shown in FIG. 3, shield plate bearers 15, 16, 17 are integrally formed on a lower side (rear) of the body 1. Pins 15a, 16a are provided on the shield plate bearers 15, 16, respectively. After the shield plate 13 is placed in position by fitting the pins 15a, 16a in holes 18, 18a formed in the magnetic shield plate 13, the shield plate 13 and the shield plate bearers 15, 16, 17 are fixed with an adhesive.

Figure 4:
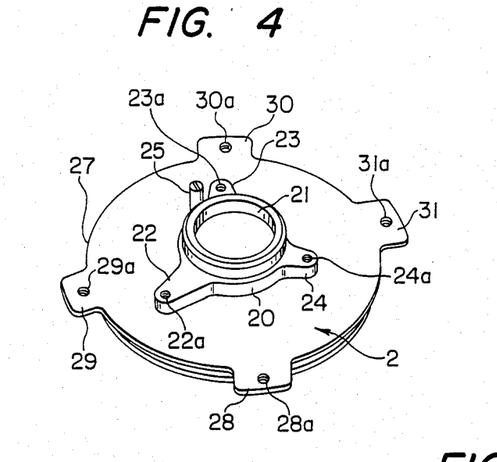
FIG. 4 is a perspective view of a drive motor.
Figure 5:
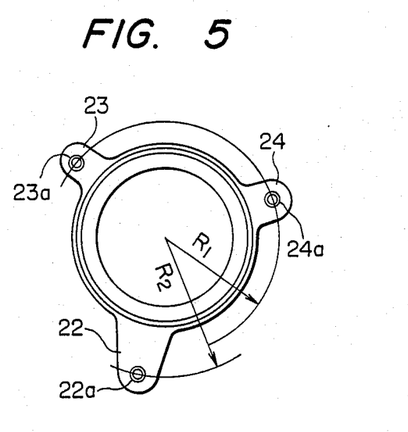
FIG. 5 is a plan view of a detail of a mounting arrangement of the drive motor.

A flexible floppy disc 19 has data recorded on both sides. The drive motor 2, working as a driving source for rotating the disc 19, is provided, as shown in FIG. 1, FIG. 4 and FIG. 5, with a socket and a spigot joint 20 fitted in the opening 8 of the body 1 and a rotary hub 21. Three projections 22, 23, 24 are provided on the socket and spigot joint 20. Mounting tapped holes 22a, 23a, 24a are provided in the projections 22, 23, 24, respectively. A distance $R_2$ from the center of the mounting tapped hole 22a to the center of the rotary hub 21 is larger than a distance $R_1$ from the centers of the other two mounting tapped holes 23a, 24a to the center of the rotary hub 21. An index sensor 25 for determining read/write time of the data recorded on the floppy disc 19 is provided on the drive motor 2. A hole 26 in which the index sensor 25 is fitted is provided on the body 1.

Figure 6:
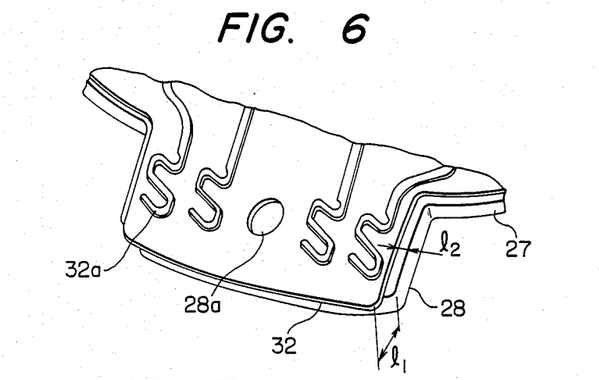
FIG. 6 is a perspective view, on an enlarged scale of the drive motor.

Four projections 28, 29, 30, 31 are provided, as shown in FIG. 4, on the outer periphery of a yoke 27 of the drive motor 2. Mounting tapped holes 28a, 29a, 30a, 31a are formed in the projections 28, 29, 30, 31, respectively, and a printed substrate 32 for connecting the drive motor 2 and the control substrate 3 is also provided thereon. As shown in FIG. 6, a substantially S-shaped contact pattern 32a for electrically connecting the drive motor 2 and the control substrate 3 is provided on the printed substrate 32. As shown in FIG. 6, the printed substrate 32 projects by a distance $l_1$ from outer peripheries of the projections 28, 29, 30, 31 and is also recessed by a distance $l_2$ from the periphery of the projections 28, 29, 30, 31.

Figure 7:
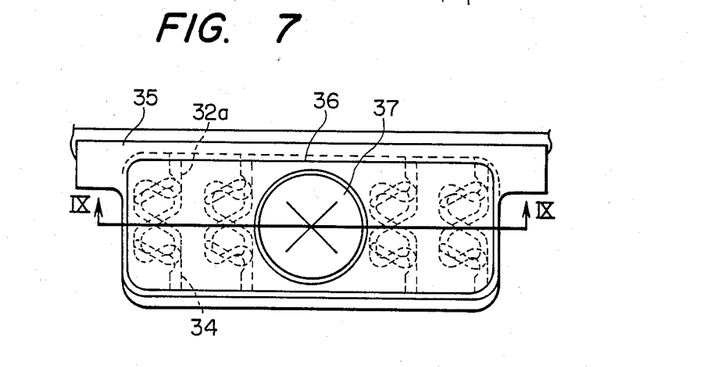
FIG. 7 is an enlarged top view of a connection of the drive motor and control substrate.
Figure 8:
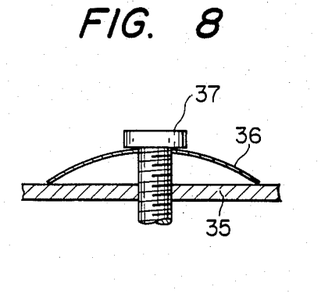
FIG. 8 is a detailed view of a mounting arrangement of the drive motor.
Figure 9:
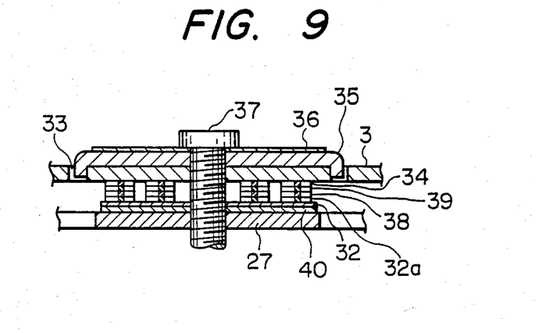
FIG. 9 is a cross-sectional view taken along the line IX—IX in FIG. 7.

A hole 33 in which the drive motor 2 is fitted is provided in the control substrate 3. An S-shaped contact pattern 34, pressed onto the contact pattern 32a, is provided near the hole 33. The contact pattern 34 and the contact pattern 32a are electrically connected by fixing the drive motor 2 and the control substrate 3, as shown in FIG. 7 to FIG. 9, by a washer 35, a spring washer 36 and a screw 37. As shown in FIG. 7, the S-shape of the contact pattern 32a and that of the contact pattern 34 are inversely superposed. The spring washer 36 is curved, as shown in FIG. 8, however, it is flattened, as shown in FIG. 9, by tightening the screw 37. Solder 38, 39 is uniformly deposited on the surfaces of the contact pattern 32a and the contact pattern 34, respectively. The contact pattern 32a and the projection 28 of the yoke 27 are fixed, as shown in FIG. 9, with an adhesive 40.

Figure 10:
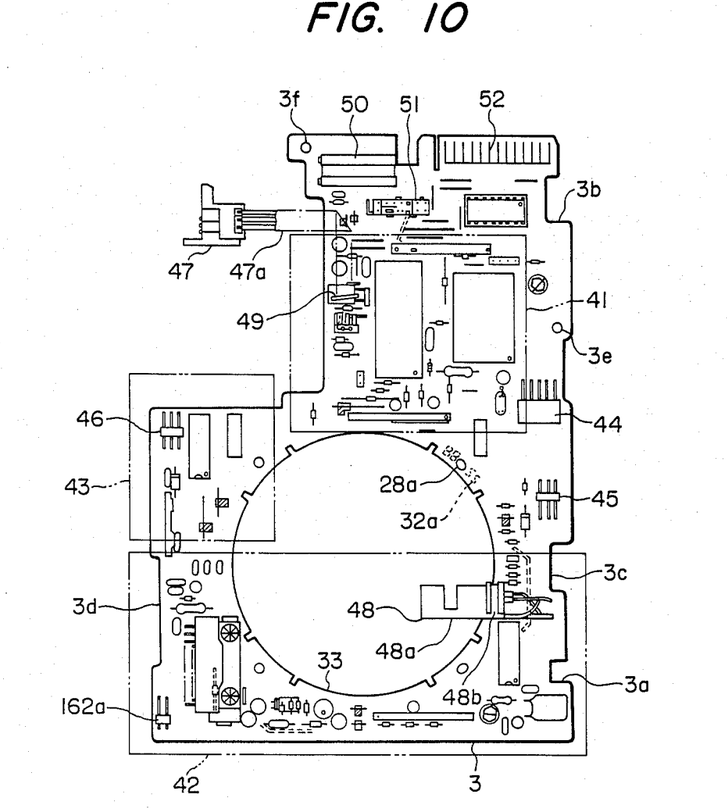
FIG. 10 is a top view of a control substrate.

A read/write circuit 41, a drive motor control circuit 42 and a step motor control circuit 43 are incorporated, as shown in FIG. 10, in the control substrate 3. A magnetic head terminal 44, and on/off switch terminal 45 and a step motor terminal 46 are provided on the control substrate 3. A track sensor 47 for detecting the position of the outermost peripheral track of the floppy disc 19, and a write protect sensor 48 for preventing writing to the floppy disc 19 are connected electrically to the control substrate 3 through lead wires 47a, 48a. A hard flat cable is used for the lead wire 47a. A holder 49, preventing disconnection of a weld zone 47b of the lead wire 47a, is mounted on the control substrate 3 so as to come near the weld zone 47b.

The write protect sensor 48 is provided with a floppy disc detecting recess 48a and a control substrate mounting area 48b, which is fixed on the control substrate 3 by fitting the control substrate mounting area 48b in a recess 3a formed in an outer periphery of the control substrate 3.

Wiring recesses 3b, 3c, 3d are provided in the outer periphery of the control substrate 3. A power connector 50 and a short pin 51 are installed on the control substrate 3, and a signal terminal 52 is printed thereon. The control substrate 3 is fixed on the body 1 by thrusting screws 54, 54a in mounting holes 3e, 3f provided in the control substrate 3 and a tapped hole 53 provided in the body 1.

Figure 11:
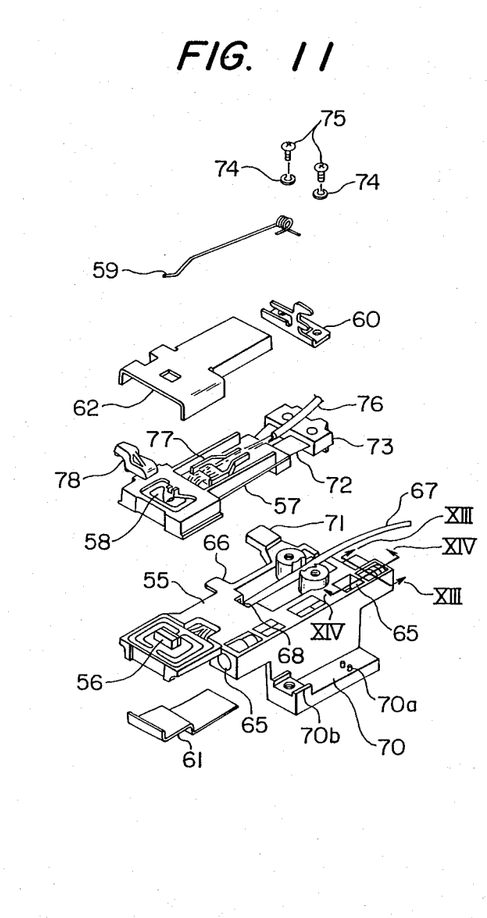
FIG. 11 is an exploded perspective view of a head mechanism.

The head mechanism 5 is provided, as shown in FIG. 11, with a carriage 55 of a synthetic resin, a first magnetic head 56 gimbaled on the carriage 55, a head arm 57, of synthetic resin, supported on the carriage 55, a second magnetic head 58 gimbaled on the head arm 57, a head spring 59 working as a means for pushing the second magnetic head 58 toward the first magnetic head 56, a metallic spring support 60 for supporting one end of the head spring 59 on the carriage 55, a shield plate 61 bonded to the carriage 55, and a shield plate 62 bonded to the head arm 57.

Figure 12:
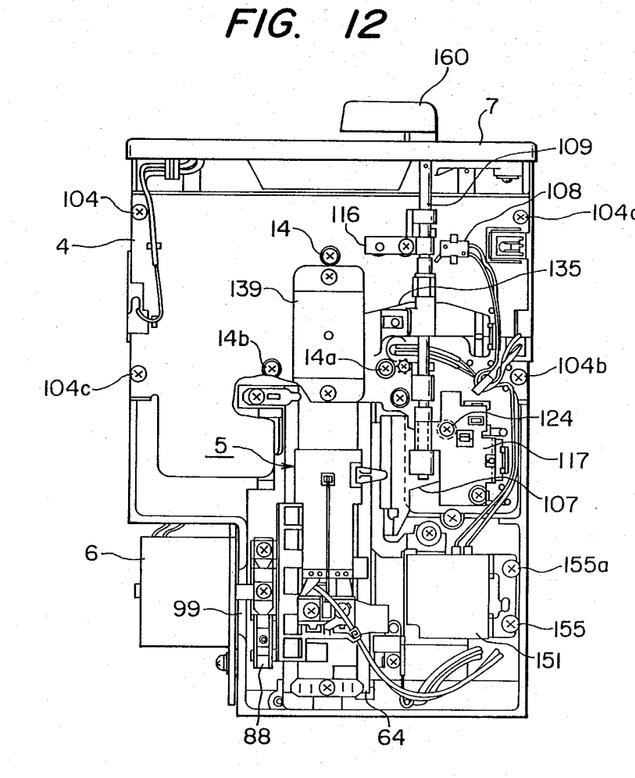
FIG. 12 is a plan view of the head mechanism of FIG. 11.

The head mechanism 5 is mounted, as shown in FIG. 12, slidably on the body 1 by two shafts 63, 64. A through hole 65 in which the shaft 63 is fitted, a U-groove 66 in which the shaft 64 is fitted, a through hole 68 of a head cord 67 connected to the first magnetic head 56, a projection 69 for fixing the head cord 67, a fixing part 70 for fixing a means for converting forward-/reverse rotatation of the stepping motor 6 into a reciprocating motion along the longitudinal axis of the shafts 63, 64, and a position detecting projection 71 for the track sensor 47 are formed, as shown in FIG. 11, on the carriage 55.

The head arm 57 is mounted on the carriage 55 by a leaf spring 72 and a support member 73 fixed on the leaf spring 72. The support member 73 and the spring support 60 are fixed on the fixing projection 69 for the carriage 55 by a spring washer 74 and a screw 75. A guide wall 77 of the head cord 76 connected to the second magnetic head 58 and an engaging claw 78 engaging the head load mechanism which will be described later are formed integrally on the head arm 57.

Figures 13, 14, 15, 16:
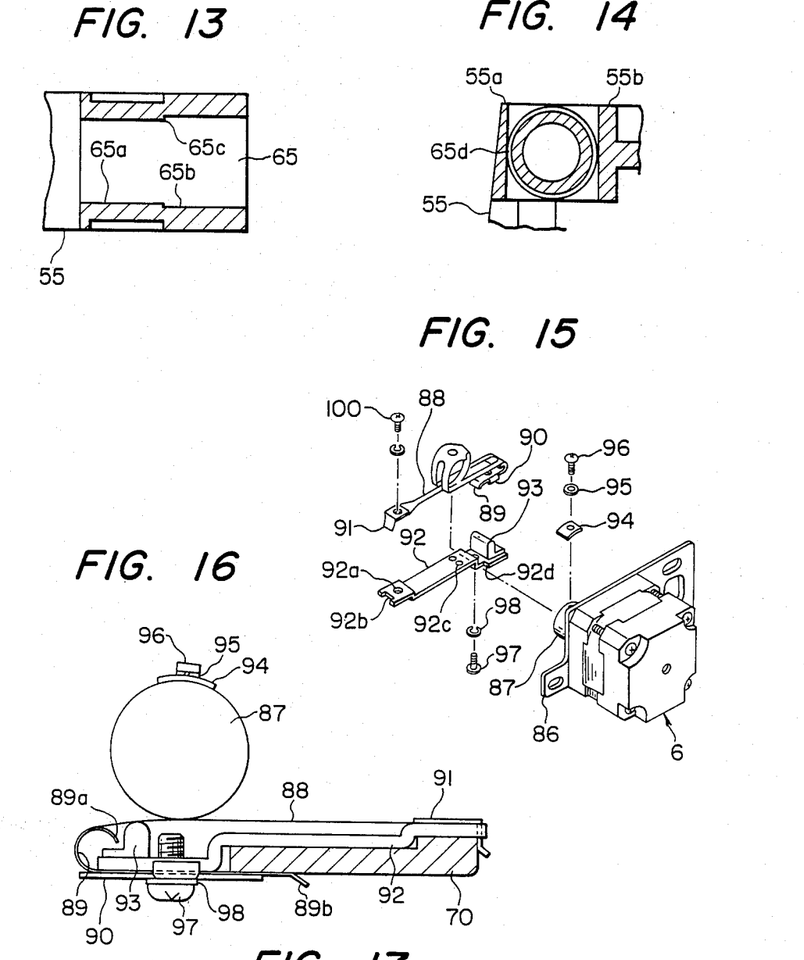
FIG. 13 is a cross-sectional view taken along the line XIII—XIII in FIG. 11.
FIG. 14 is a cross-sectional view taken along the line XIV—XIV in FIG. 11.
FIG. 15 is an exploded perspective view of a stepping motor unit.
FIG. 16 is an enlarged side view of a steel belt unit.

The through hole 65 of the carriage 55 includes a small diametral zone 65a and a large diametral zone 65b, as shown in FIG. 13, and is provided with a tier 65c. An outer periphery of the small diametral zone 65a is kept detached from ribs 55a, 55b formed on the carriage 55, as shown in FIG. 14, by forming a recess 65d on the outer periphery. The small diametral zone 65a of the through hole 65 can thus be prevented from being ellipsoidal at the time of molding.

A mounting of the head mechanism 5 comrpises first inserting the shaft 63 in the through hole 65 and then inserting the shaft 64 in the U-groove 66. Next, the shafts 63, 64 are placed on L-shaped bearers 79, 79a, 79b, 79c formed on the body 1. Both ends of the shafts 63, 64 will be then fixed on the body 1 by support fittings 80, 81, 82 and screws 83, 84, 85. The screws 83, 84, 85 are detachable even in the state where all parts are mounted on the body 1. The head mechanism 5 can simply be demounted from the body 1 by removing the screws 83, 84, 85 from the body 1.

The stepping motor 6 is a driving source for moving the head mechanism 5 on the shafts 63, 64. As shown in FIG. 15, the stepping motor 6 has a mounting plate 86 and an output pulley 87. A tension spring 89 and a square washer 90 are welded on one end and a square washer 91 is welded on another end of a steel belt 88 working as a means for transferring the torque of the stepping motor 6 to the head mechanism. A metallic subplate 92 is provided with a support member 93 of synthetic resin for supporting the steel belt 88 on one end and a mounting hole 92a and a recess 92b on another end. The subplate 92 is further provided with a hole 92c engaging with a positioning projection 70a formed on the fixed part 70 of the carriage 5 at the central portion.

Figure 17:
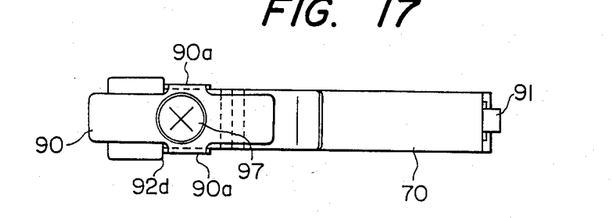
FIG. 17 is an enlarged bottom view of the steel belt unit.

After winding round the output pulley 87 to a α-shape, the steel belt 88 is fixed, as shown in FIG. 16 and FIG. 17, on the output pulley 87 by a washer 94, a spring washer 95 and a screw 96. The square washer 91 provided on one end of the steel belt 88 engages the recess 92b of the subplate 92. The tension spring 89 and the square washer 90 provided on the other end of the steel plate 88 are fixed near the support member 93 of the subplate 92 by means of a screw 97 and a washer 98. A detent bend 90a is provided on the square washer 90. The bend 90a of the square washer 90 contacting the tier 92d. The tension spring 89 has its one end 89a bent semicircularly and another end 89b bent like chamfer.

For mounting the stepping motor 6 and the steel belt 88 on the body 1, first the head mechanism 5 is mounted on the body 1, and then the stepping motor 6 and the steel belt 88 are fitted over a notch 99 of the body 1. Next, the bend 89b of the tension spring 89 is inserted in the fixed part 70 of the carriage 55, the hole 92c of the subplate 92 is engaged with the projection 70a of the fixed part 70, the square washer 91 of the steel belt 88 engages a rib 70b of the fixed part 70 of the carriage 55, and then fixed on the fixed part 70 by a screw 100. Finally, the mounting plate 86 of the stepping motor 6 is fixed on a side of the body 1 by washers 101, 101a and screws 102, 102a, thus finishing the mounting of the stepping motor 6.

The steel mounting plate 4 fixed on notches 103, 103a of the body 1 by screws 104, 104a, 104b, 104c is detachably mounted on the body 1. A collet mechanism 105, a veil plate 107 of a head load mechanism 106, an on/off switch 108 of the drive motor 2, and a shaft 109 for operating the on/off switch 108 are mounted on the mounting plate 4.

Figure 19:
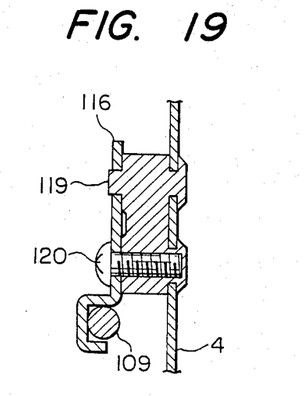
FIG. 19 is an enlarged sectional view of a main portion of a bearing plate for journalling a shaft.

A cam 110 for operating the on/off switch 108, a cam 111 for operating the collet mechanism 105, and a cam 112 for operating the veil plate 107 of the head load mechanism 106 are fixed on the shaft 109. The shaft 109 is journaled rotatably in the mounting plate 4 by bearings 113, 114, 115 and two bearing plates 116, 117. The bearing plate 116 is fixed on the mounting plate 4, as shown in FIG. 19, by means of a boss 118 and a pin 119 provided solidly on the mounting plate 4 and a tapping screw 120. The bearing plate 117 is fixed on the mounting plate 4 by two bosses 121, 123 provided solidly on the mounting plate 4 and two screws 124, 125. Movement of the shaft 109 in the direction of thrust is prevented by catching the bearing 114 between the cams 110 and 111.

Figure 20:
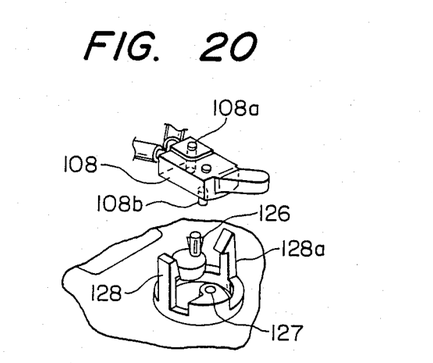
FIG. 20 is an enlarged perspective view depicting a state wherein an on/off switch is not mounted on a mounting plate.
Figure 21:
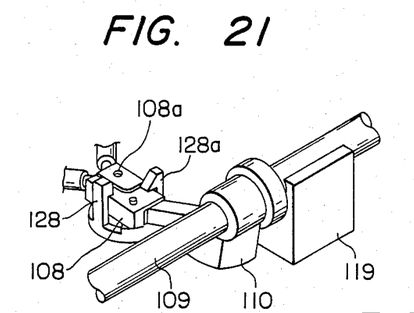
FIG. 21 is an enlarged perspective view depicting a state wherein an on/off switch is mounted on the mounting plate.

The on/off switch 108 is detachably mounted detachably on the mounting plate 4 by fitting a hole 108a and a pin 108b provided on the on/off switch 108 in a pin 126 and a hole 127 formed on the mounting plate 4, and also by engaging an outer peripheral portion of the on/off switch 108 with elastic hooks 128, 128a, as shown in FIGS. 20 and 21.

Figure 18:
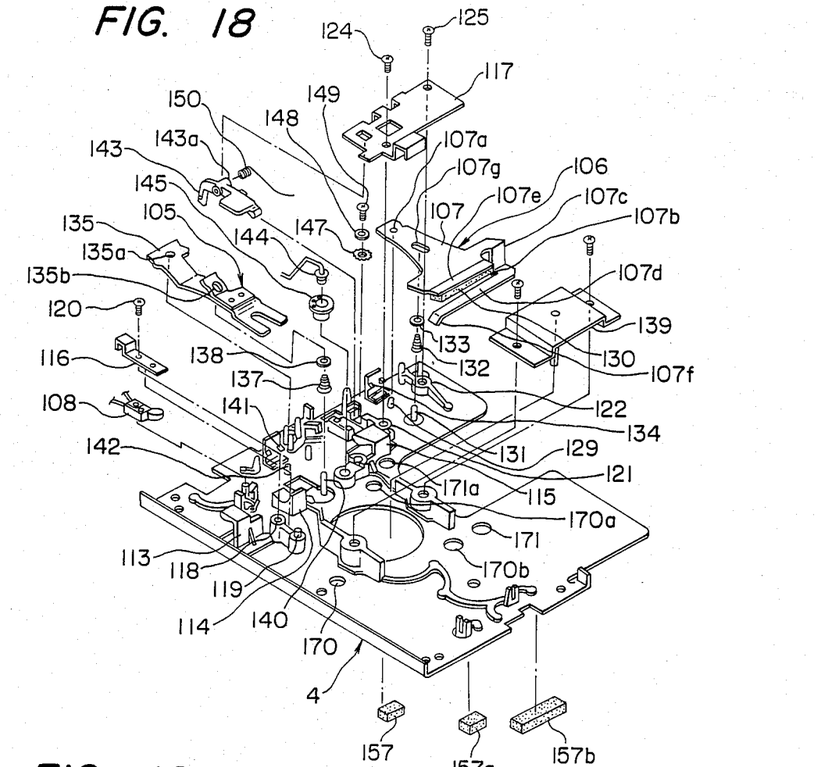
FIG. 18 is an exploded perspective view of a mounting plate unit.
Figure 22:
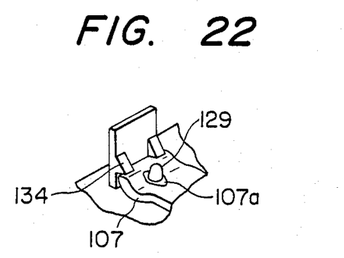
FIG. 22 is an enlarged perspective view depicting a state wherein a veil plate is mounted on the mounting plate.
Figure 23:
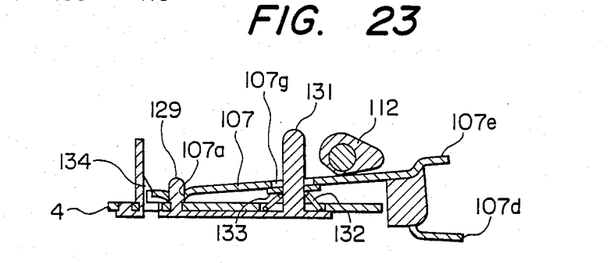
FIG. 23 is an enlarged sectional view of a portion of the veil plate.

As shown in FIGS. 18, 22 and 23, the veil plate 107 of the head load mechanism 106 has a hole 107a which a pin 129 formed on the mounting plate 4 engages, formed on one end, and an L-shaped cut 107b formed on another end. One side 107d of the cut 107b is positioned below one side 107e of the cut 107b by bending one side 107c of the cut 107b. A chamferred bend 107f is formed on a tip of one side 107d of the cut 107b. A pad 130 is bonded and fixed on the lower surface of one side 107e. A hole 107g, engageable by a pin 131 formed on the mounting plate 4, is formed almost at the center of the veil plate 107.

For mounting the veil plate 107 on the mounting plate 4, a spring 132 and a washer 133 are inserted in the pin 131, one end of the veil plate 107 is then locked to a claw 134 formed on the mounting plate 4, and the pins 129, 131 are engaged with the holes 107a, 107g of the veil plate 107.

Figure 24:
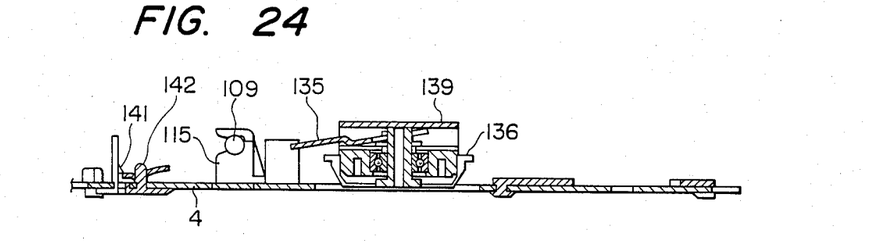
FIG. 24 is an enlarged cross-sectional view of a collet mechanism portion.

The collet mechanism 105 is provided with a metallic operating plate 135, a collet 136 of synthetic resin fitted in a recess 21a of the rotary hub 21, a spring 137 for energizing the operating plate 135 in one direction, a washer 138 for preventing the spring 137 from coming off, and a collet receiver 139 of the collet 137. For mounting the operating plate 135 on the mounting plate 4, the spring 137 and the washer 138 are inserted in a pin 140 formed on the mounting plate 4, one end of the operating plate 135 is locked to a claw 141 formed on the mounting plate 4, and a pin 142, formed on the mounting plate 4, and the pin 140 are engaged with holes 135a, 135b formed in the operating plate 135 near the claw 141. (FIG. 1, FIG. 18 and FIG. 24)

Figure 25:
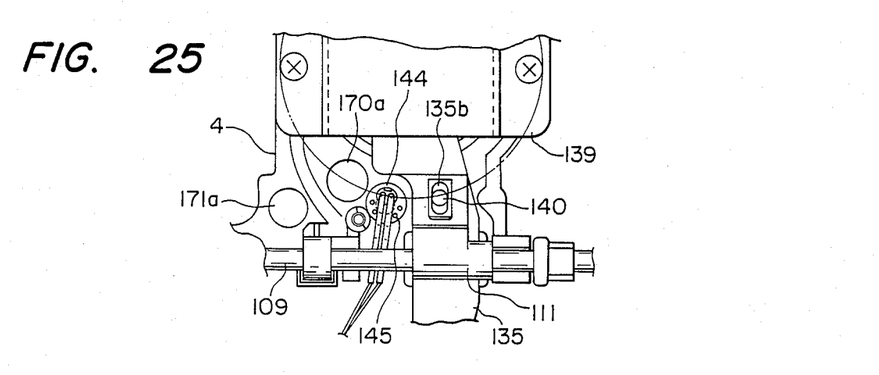
FIG. 25 is an enlarged top view of a collet bearing portion.
Figure 26:
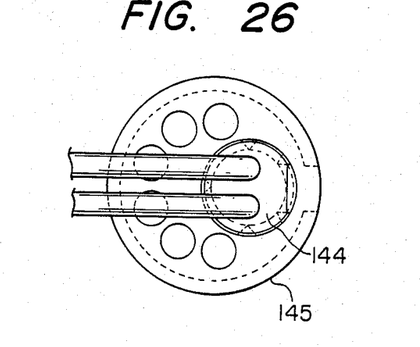
FIG. 26 is an enlarged top view of an index sensor portion.
Figure 27:
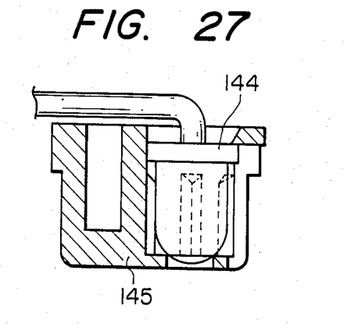
FIG. 27 is an enlarged cross-sectional view of an index sensor portion.

A disc lock lever 143 and an index sensor 144 are mounted on the mounting plate 4. The index sensor 144 is fixed in a mounting hole 146 of the mounting plate 4 through an adjusting holder 145, as shown in FIGS. 25, 26 and 27, as adjusting with a toothed washer 147, a spring washer 148 and a screw 149. A spring 150 is incorporated in a shaft 143a of the disc lock lever 143.

Figure 2:
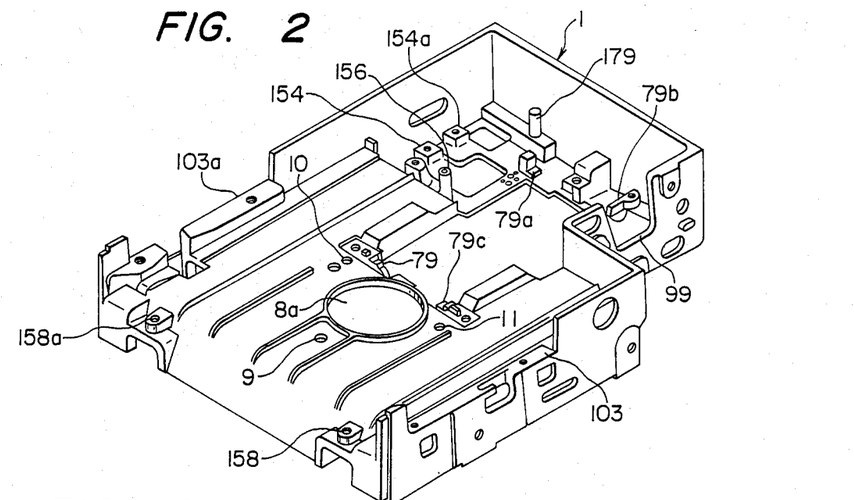
FIG. 2 is an upper perspective view of a body of the device of FIG. 1.
Figures 28, 29:
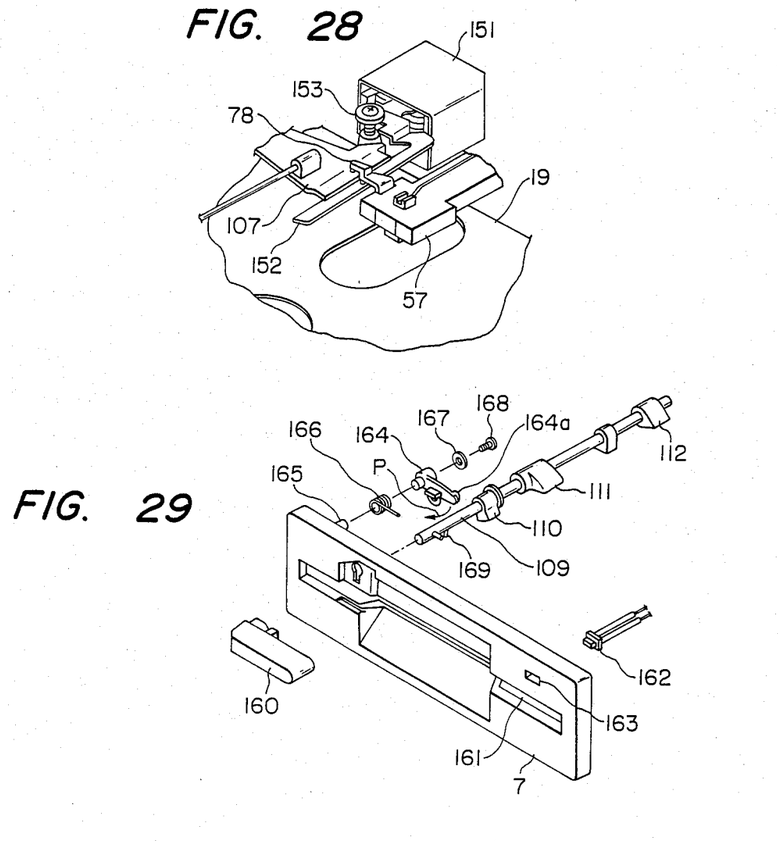
FIG. 28 is an enlarged perspective view of a head load mechanism.
FIG. 29 is an exploded perspective view of a front panel unit.

The head load mechanism 106 is provided, as shown in FIG. 28, with the veil plate 107 mounted on the mounting plate 4, a solenoid 151 mounted on the body 1, a moving plate 152 actuated on the solenoid 151, and an adjusting member 153 for height of the moving plate 152. The solenoid 151 is fixed on mounting planes 154, 154a of the body 1 shown in FIGS. 1 and 2 by screws 155, 155a. The height adjusting member 153 is mounted on a boss 156 provided on the body 1. The height adjusting member 153 is provided with a screw 153a fitted on the boss 156 and a head 153b with a silencing material thereon. The moving plate 152 is put under the engaging claw 78 on the head arm 57 as shown in FIG. 28.

A space for enclosing the floppy disc 19 therein is formed between the mounting plate 4 and the body 1. Sponge pads 157, 157a, 157b for preventing vibration or fluttering of the floppy disc 19 are bonded to the lower surface of the mounting plate 4.

The front panel 7 is detachably provided on the front of the body 1 by tapped holes 158, 158a and screws 159, 159a. An operating lever 160 for operating the shaft 109 is provided on the front of the front panel 7. As shwon in FIG. 29, an insertion port 161 of the floppy disc 19, a mounting hole 163 of a display lamp 162, and a mounting shaft 165 of a lock lever 164 are provided on the front panel 7. The lock lever 164 is rotatable relative to the mounting shaft 165 by mounting tapping screw 168 on the mounting shaft 165 after inserting a torsion spring 166, lock lever 164 and washer 167 in the mounting shaft 165.

The torsion spring 166 works so that the lock lever 164 will turn in the direction indicated by an arrow P in FIG. 29 at all times. The lock lever 164 turns in the direction counter to that of the direction the arrow P if the floppy disc 19 is incompletely inserted, and a pin 169 provided on the shaft 109 is engaged with a nose 164a of the lock lever 164. Consequently, the operating lever 160 is kept from turning.

If the floppy disc 19 is inserted as far as a predetermined position (normal position) of the body 1, then the lock lever 164 turns in the direction of the arrow P on the torsion spring 166, and the pin 169 and the lock lever 164 are disengaged, therefore the operating lever 109 becomes ready for turning.

Driver insertion holes 170, 170a, 170b for removing the screws 14, 14a, 14b of the drive motor 2 are provided in the mounting plate 4. Further, driver insertion holes 171, 171a for removing the screws 83, 84 for fixing the support fittings 80, 81 on the body 1 are provided in the mounting plate 4.

Figure 30:
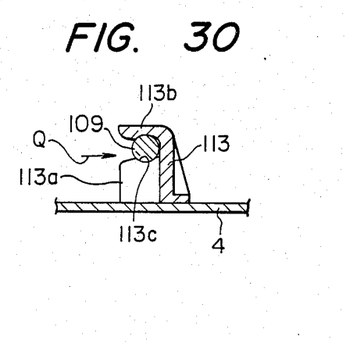
FIGS. 30 and 31 are enlarged cross-sectional views of a shaft bearer unit.
Figure 31:
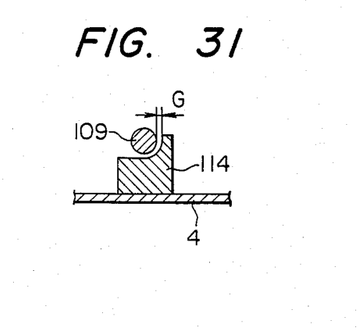

The bearer 113, formed on the mounting plate 4, has a bearing 113a and a stopper 113b as shown in FIG. 30. A curve 113c in which the shaft 109 is fitted is formed on the bearing 113a. The stopper 113b is subjected to elastic deformation when the shaft 109 is fitted in from the direction indicated by an arrow Q. The bearing 115 and 113 are united into a single structure. The bearer 114 formed on the mounting plate 4 is provided, as shown in FIG. 31, with a gap G to the shaft 109, which may serve as a bearing for the shaft 109 in a thrust direction.

Figure 32:
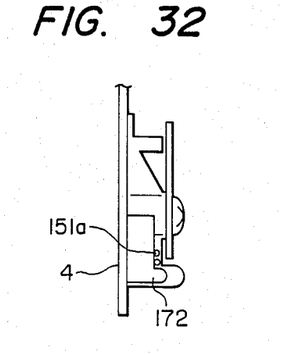
FIG. 32 is an enlarged side view of a lead wiring rib unit.
Figure 33:
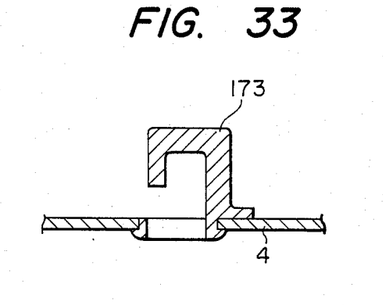
FIG. 33 is an enlarged cross-sectional view of a wire ring holder unit.

The mounting plate 4 is provided, as shown in FIG. 32, with a rib 172 for wiring a lead wire 151a from the solenoid 151, and also provided, as shown in FIG. 33, with a wiring holder 173.

Figure 34:
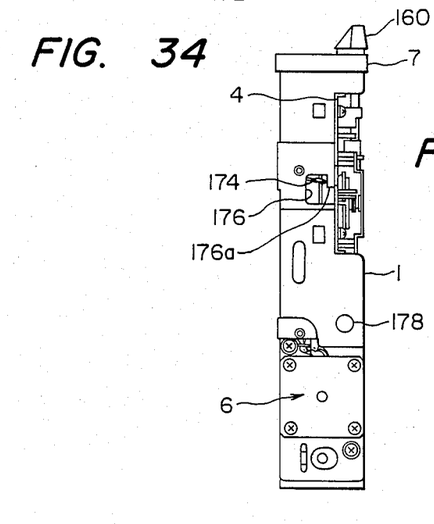
FIG. 34 is a left side view of the head mechanism of FIG. 12.
Figure 35:
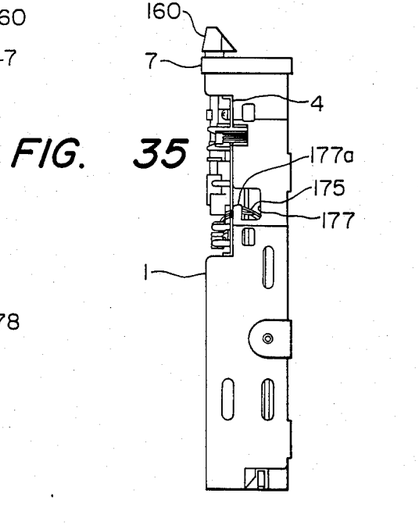
FIG. 35 is a right side view of the head mechanism of FIG. 12.
Figure 36:
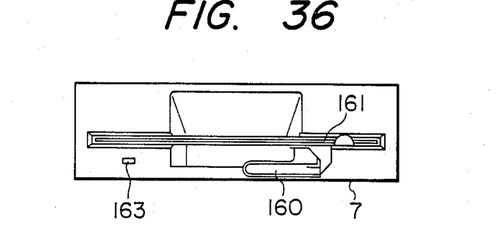
FIG. 36 is a top view of the head mechanism of FIG. 12.
Figure 37:
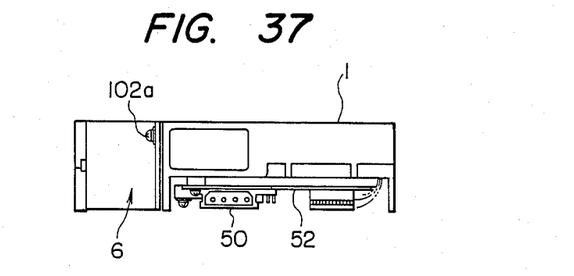
FIG. 37 is a bottom view of the head mechanism of FIG. 12.

Through holes 176, 177 for wiring 174, 175 are provided, as shown in FIGS. 34 and 35, on both sides of the body 1. Hooks 176a, 177a are formed on the through holes 176, 177 respectively. A window 178 through which movement of the first magnetic head 56 and the second magnetic head 58 of the head mechanism 5 can be observed is provided on a side of the body 1. A pin 179 and a hole 180 for wiring the lead wire 47a of the track sensor 47 are provided on the body 1. The track sensor 47 is mounted on a rib 181 and a tapped hole 182 provided on the body 1 by a washer 183 and a screw 184.

In the above construction, a general assembly of the device is performed as follows. First, the head mechanism 5 is fixed on the body 1 by the support fittings 80, 81, 82 and the screws 83, 84, 85. Next, the stepping motor 6 with the steel belt 88 premounted on the output pulley 87 is fixed on the body 1 by the washers 101, 101a and the screws 102, 102a. The carriage 55 of the head mechanism 5 and the steel belt 88 are connected integrally by the square washers 90, 91 and the screw 100.

Then, the mounting plate 4 on which the preinstalled parts such as collet mechanism 105, veil plate 107 of the head load mechanism 106, on/off switch 108, shaft 109 and others are is fixed on the body 1 by the screws 104, 104a, 104b, 104c. Next, the solenoid 151 of the head load mechanism 106 is fixed on the body 1 by the screws 155, 155a, and the height adjusting member 153 of the head load mechanism 106 is also fixed on the body 1 on its own screw 153a. Next, the body 1 is turned over, and the control substrate 3 on which the preinstalled parts such as drive motor 2, write protect sensor 48 and others and various circuits such as read line circuit 41 and others is fixed on the body 1 by the screws 54, 54a, and finally the front panel 7 is fixed on the body 1 by the screws 159, 159a, thus completing the assembly of main parts.

Figure 38:
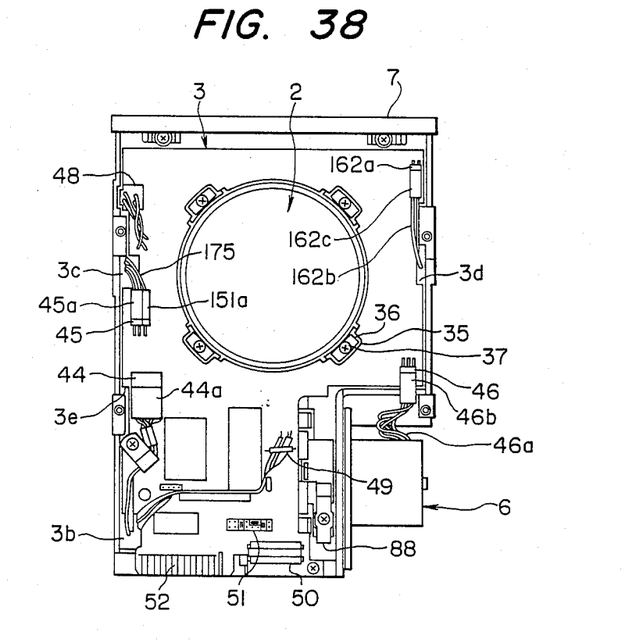
FIG. 38 is a rear elevational view of the head mechanism of FIG. 12.

The first magnetic head 56 and the second magnetic head 58 are electrically connected to the magnetic head terminal 44 provided on the control substrate 3 by the head cords 67, 76 and plug socket 44a. The on/off switch 108 is electrically connected to the on/off switch terminal 45 through the wiring 175 led from the side of mounting plate 4 to the side of control substrate 3 through the hole 177 of the body 1 and a plug socket 45a. The stepping motor 6 is electrically connected to the stepping motor terminal 46 through a wiring 46a and a plug socket 46b. The display lamp 162 is connected electrically to the display lamp terminal 162a through a wiring 162b and a plug socket 162c. The solenoid 151 is connected to the control substrate 3 through the plug socket 151a. (FIG. 38)

For removing the drive motor 2 or the control substrate 3 after the assembly is over, a driver is inserted through the driver insertion holes 170, 170a, 170b of the mounting plate 4, the screws 14, 14a, 14b are thus removed from the body 1, the body 1 is then turned over and the screws 54, 54a are removed from the body 1.

For removing the front panel 7, the work can be simplified by removing the operating lever 160 from the shaft 109 and removing the screws 159, 159a from the body 1.

A removing of the mounting plate 4 can be simplified by removing the screws 104, 104a, 104b, 104c from the body 1 and then releasing the shaft 109 from being locked to the front panel 7.

A removing of the head mechanism 5 and the step motor 6 can be simplified according to the procedure wherein a driver is inserted through the insertion holes 171, 171a of the mounting plate 4, the screws 83, 84 are thus loosened, the remaining screw 82 is also loosened by the driver, the shafts 63, 64 fitted in the carriage 55 are removed from the body 1, and also the screws 102, 102a are removed from the body 1. The head mechanism 5 and the step motor 6 can be separated by removing the screw 97 from the fixed part 70 of the carriage 55, and then removing the steel belt 88. When removing the head mechanism 5 or the step motor 6 separately from the body 1, the carriage 55 and the steel belt 88 will be separated, and then the screws 82, 83, 84 will be removed or the screws 102, 102a will be removed.

The solenoid 151 of the head load mechanism 106 can be removed by removing the screws 155, 155a from the body 1. The height adjusting member 153 can be adjusted simply by adjusting the insertion depth of the screw 153a into the body 1 on a driver. In the embodiment, since a silencing material is provided on the head 153b of the height adjusting member 153, a sound arising from a collision of the moving plate 152 with the head 153b of the height adjusting member 153 can be suppressed considerably.

Further in the embodiment, the control substrate 3 is made into a single layer, the read/write circuit 41, the drive motor control circuit 42, and the step motor control circuit 43 are incorporated in the control substrate 3, and each circuit can be electrically connected on a printed circuit without using a plug socket and a lead wire, therefore fewer parts are needed, wiring is simplified, and productivity can be enhanced. On/off action of the circuits incorporated in the control substrate 3 with the stepping motor 6, the first magnetic head 56, the second magnetic head 58, the solenoid 151, the display lamp 162 and the index sensor 144 can be remarkably simplified by a plug socket.

As described, according to this invention, one control substrate is disposed only on one side of the body, a drive motor is premounted on the control substrate, removal and remounting can be simplified at every portion of the control substrate, mounting plate, head mechanism, stepping motor and front panel, therefore each part can be checked and repaired easily to enhance serviceability, and the number of parts can be decreased and a wiring work can be simplified, thereby obtaining a magnetic disc driving device wherein productivity will be enhanced furthermore.

What is claimed is:

1. A magnetic disc driving device having a body, a control substrate member detachably disposed on a lower side of said body, said control substrate member incorporating a read-write circuit, a drive motor control circuit and a stepping motor control circuit, a head mechanism member detachably disposed on an upper side of said body, said head mechanism member comprising a carriage and a magnetic head, a stepping motor for moving said head mechanism member detachably disposed on a side of said body, said stepping motor having an output pulley, a means for transferring a torque of said stepping motor to said head mechanism member fixed on said output pulley of said stepping motor, a drive motor for rotating said magnetic disc mounted on said control substrate member, a mounting plate member detachably disposed on the upper side of said body, and a front panel having an insertion port for said magnetic disc detachably disposed on a front side of said body, wherein said stepping motor with said torque transfer means is fitted over a notch of said body from an upper side of said body, said torque transfer means penetrates through said notch, so that said stepping motor is disposed at an outside of said body, and wherein a collet mechanism member, a veil plate member of a head load mechanism member, and an on/off switch for said drive motor are installed on said mounting plate member.

2. A magnetic disc driving device as defined in claim 1, wherein a shaft is rotatably mounted on said mounting plate member and fixes a cam for operating the collet mechanism member, a cam for operating the veil plate member of the head load mechanism member, and a cam for operating the on/off switch thereon.

3. A magnetic disc driving device having a body, a control substrate member detachably disposed on a lower side of said body, said control substrate member incorporating a read-write circuit, a drive motor control circuit and a stepping motor control circuit, a head mechanism member detachably disposed on an upper side of said body, said head mechanism member comprising a carriage and a magnetic head, a stepping motor for moving said head mechanism member detachably disposed on a side of said body, said stepping motor having an output pulley, a means for transferring a torque of said stepping motor to said head mechanism member fixed on said output pulley of said stepping motor, a drive motor for rotating said magnetic disc mounted on said control substrate member, a mounting plate member detachably disposed on the upper side of said body, and a front panel having an insertion port for said magnetic disc detachably disposed on a front side of said body, wherein said stepping motor with said torque transfer means is fitted over a notch of said body from an upper side of said body, said torque transfer means penetrates through said notch, so that said stepping motor is disposed at an outside of said body, wherein a collet mechanism member, a veil plate member of a head load mechanism member, and an on/off switch for said drive motor are installed on said mounting plate member, wherein a solenoid of the head load mechanism member and a height adjusting member for a moving plate member moving on the solenoid are detachably provided on said body.

4. A magnetic disc driving device having a body, a control substrate member detachably disposed on a lower side of said body, said control substrate member incorporating a read-write circuit, a drive motor control circuit and a stepping motor control circuit, a head mechanism member detachably disposed on an upper side of said body, said head mechanism member comprising a carriage and a magnetic head, a stepping motor for moving said head mechanism member detachably disposed on a side of said body, said stepping motor having an output pulley, a means for transferring a torque of said stepping motor to said head mechanism member fixed on said output pulley of said stepping motor, a drive motor for rotating said magnetic disc mounted on said control substrate member, a mounting plate member detachably disposed on the upper side of said body, and a front panel having an insertion port for said magnetic disc detachably disposed on a front side of said body, wherein said stepping motor with said torque transfer means is fitted over a notch of said body from an upper side of said body, said torque transfer means penetrates through said notch, so that said stepping motor is disposed at an outside of said body, wherein a collet mechanism member, a veil plate member of a head load mechanism member, and an on/off switch for said drive motor are installed on said mounting plate member, wherein a solenoid of the head load mechanism member and a height adjusting member for a moving plate member moving on the solenoid are detachably provided on said body, and wherein said height adjusting member is provided with a screw fitted to a boss of said body and a head functioning as a silencer.

5. A magnetic disc driving device having a body, a control substrate member detachably disposed on a lower side of said body, said control substrate member incorporating a read-write circuit, a drive motor control circuit and a stepping motor control circuit, a head mechanism member detachably disposed on an upper side of said body, said head mechanism member comprising a carriage and a magnetic head, a stepping motor for moving said head mechanism member detachably disposed on a side of said body, said stepping motor having an output pulley, a means for transferring a torque of said stepping motor to said head mechanism member fixed on said output pulley of said stepping motor, a drive motor for rotating said magnetic disc mounted on said control substrate member, a mounting plate member detachably disposed on the upper side of said body, and a front panel having an insertion port for said magnetic disc detachably disposed on a front side of said body, and wherein said stepping motor with said torque transfer means is fitted over a notch of said body from an upper side of said body, said torque transfer means penetrates through said notch, so that said stepping motor is disposed at an outside of said body, wherein said drive motor and said control substrate member are electically connected by pressing a contact pattern provided on a yoke of said drive motor onto a contact pattern provided on said control substrate member, and wherein the contact pattern provided on the yoke has a substantially S-shaped configuration and the contact pattern provided on said control substrate member has a substantially reversed S-shaped configuration.

6. A magnetic disc driving device having a body, a control substrate member detachably disposed on said body, said control substrate member incorporating a read/write circuit, a drive motor control circuit and a stepping motor control circuit, a head mechanism member detachably disposed on said body, said head mechanism member comprising a carriage and a magnetic head, a stepping motor for moving said head mechanism member detachably disposed on said body, said stepping motor having an output pulley, a means for transferring a torque of said stepping motor to said head mechanism member fixed on said output pulley of said stepping motor, a front panel having an insertion portion for said magnetic disc detachably disposed on said body, a drive motor for rotating said magnetic disc mounted on said control substrate member, and a mounting plate member detachably disposed on said body, and wherein said stepping motor with said torque transfer means is fitted over a notch of said body from an upper side of said body, said torque transfer means penetrates through said notch, so that said stepping motor is disposed at an outside of said body, and a collet mechanism member, a veil plate member of a head load mechanism member, and an on/off switch for said drive motor are installed on said mounting plate member.

7. A magnetic disc driving device as defined in claim 6, wherein a solenoid of the head load mechanism member and a height adjusting member for a moving plate member moving on the solenoid are detachably provided on said body.

8. A magnetic disc driving device as defined in claim 7, wherein said height adjusting member is provided with a screw fitted to a boss of said body and a head functioning as a silencer.

9. A magnetic disc driving device as defined in claim 6, wherein a shaft is rotatably mounted on said mounting plate member and fixes a cam for operating the collet mechanism member, a cam for operating the veil plate member of the head load mechanism member, and a cam for operating the on/off switch thereon.

10. A magnetic disc driving device having a body, a control substrate member detachably disposed on said body, said control substrate member incorporating a read/write circuit, a drive motor control circuit and a stepping motor control circuit, a head mechanism member detachably disposed on said body, a stepping motor detachably disposed on said body, said stepping motor having an output pulley, a means for transferring a torque of said stepping motor to said head mechanism member fixed on said output pulley of said stepping motor, said head mechanism member comprising a carriage and a magnetic head, a front panel having an insertion port for said magnetic disc detachably disposed on said body, a drive motor for rotating said magnetic disc mounted on said control substrate member, and a mounting plate member detachably disposed on said body and having a collet mechanism member and a veil plate member of a head load mechanism member mounted thereon, and wherein said stepping motor with said torque transfer means is fitted over a notch of said body from an upper side of said body, said torque transfer means penetrates through said notch, so that said stepping motor is disposed at an outside of said body, and said drive motor and said control substrate member are electrically connected by pressing a contact pattern provided on a yoke of said drive motor onto a contact pattern provided on said control substrate member, wherien said contact pattern provided on said yoke has a substantially S-shaped configuration, and wherein the contact pattern provided on the control substrate member has a substantially reversed S-shaped configuration.

* * * * *